US010228687B2

(12) United States Patent
Beaven et al.

(10) Patent No.: US 10,228,687 B2
(45) Date of Patent: Mar. 12, 2019

(54) METHOD FOR DIAGNOSING A FAULT IN AN AIR-CONDITIONING PACK OF AN AIRCRAFT

(71) Applicant: TALERIS GLOBAL LLP, Cheltenham Gloucestershire (GB)

(72) Inventors: Frank Beaven, Eastleigh Hampshire (GB); Julia Ann Howard, Eastleigh Hampshire (GB); Robert William Horabin, Eastleigh Hampshire (GB)

(73) Assignee: Taleris Global LLP, Cheltenham Gloucestershi (GB)

( * ) Notice: Subject to any disclaimer, the term of this patent is extended or adjusted under 35 U.S.C. 154(b) by 78 days.

(21) Appl. No.: 15/119,877

(22) PCT Filed: Feb. 21, 2014

(86) PCT No.: PCT/GB2014/050509
§ 371 (c)(1),
(2) Date: Aug. 18, 2016

(87) PCT Pub. No.: WO2015/124890
PCT Pub. Date: Aug. 27, 2015

(65) Prior Publication Data
US 2017/0060125 A1 Mar. 2, 2017

(51) Int. Cl.
*G05B 23/02* (2006.01)
*B64D 13/08* (2006.01)
(Continued)

(52) U.S. Cl.
CPC ......... *G05B 23/0235* (2013.01); *B64D 13/08* (2013.01); *G07C 5/0816* (2013.01); *B64D 13/06* (2013.01); *B64D 2013/0618* (2013.01)

(58) Field of Classification Search
CPC .. G05B 23/0235; G07C 5/0816; B64D 13/08; B64D 2013/0618; B64D 13/06
See application file for complete search history.

(56) References Cited

U.S. PATENT DOCUMENTS

| 5,511,385 A | 4/1996 | Drew et al. |
| 5,934,083 A | 8/1999 | Scherer et al. |

(Continued)

FOREIGN PATENT DOCUMENTS

| CN | 101799365 A | 8/2010 | |
| EP | 2682835 A2 * | 1/2014 | ............ F28F 27/00 |

(Continued)

OTHER PUBLICATIONS

International Search Report and Written Opinion dated May 12, 2014 which was issued in connection with PCT Patent Application No. PCT/GB14/050509 which was filed on Feb. 21, 2014.

(Continued)

*Primary Examiner* — Isaac T Tecklu
(74) *Attorney, Agent, or Firm* — Taleris Global LLP; Brian Overbeck

(57) ABSTRACT

A method of diagnosing a fault in an air-conditioning pack of an aircraft is disclosed, wherein the air-conditioning pack includes one or more sensors. The method includes transmitting data from at least one of the sensors operably coupled to the air-conditioning pack, comparing the transmitted data to a predetermined threshold, and diagnosing a fault in the air-conditioning pack based on the comparison.

30 Claims, 4 Drawing Sheets

(51) Int. Cl.
*G07C 5/08* (2006.01)
*B64D 13/06* (2006.01)

(56) References Cited

U.S. PATENT DOCUMENTS

| | | | |
|---|---|---|---|
| 2006/0126608 A1* | 6/2006 | Pereira | G05B 13/042 370/360 |
| 2011/0031323 A1* | 2/2011 | Nold | G05B 19/0428 236/20 R |
| 2011/0299470 A1 | 12/2011 | Muller et al. | |
| 2013/0037234 A1 | 2/2013 | Mackin | |
| 2014/0084836 A1* | 3/2014 | Pham | G01R 31/343 318/490 |
| 2014/0095935 A1* | 4/2014 | Zimmermann | H04L 12/2823 714/33 |
| 2014/0163812 A1* | 6/2014 | Randerath | G05B 23/024 701/32.9 |

FOREIGN PATENT DOCUMENTS

| | | |
|---|---|---|
| JP | 2007-168778 A | 7/2007 |
| WO | 2012163985 A1 | 12/2012 |
| WO | 2012163986 A1 | 12/2012 |
| WO | WO 2012163986 A1 * 12/2012 | ........... G05B 23/024 |

OTHER PUBLICATIONS

First Office Action and Search issued in connection with corresponding CN Application No. 201480076004.6 dated Mar. 22, 2018.

Machine Translation and Notification of Reasons for Refusal issued in connection with corresponding JP Application No. 2016-550855 dated Jan. 9, 2018.

Canadian Office Action issued in connection with corresponding CA Application No. 2940139 dated May 23, 2018.

* cited by examiner

METHOD FOR DIAGNOSING A FAULT IN AN AIR-CONDITIONING PACK OF AN AIRCRAFT

BACKGROUND

Contemporary aircrafts include air-conditioning systems that take hot air from the engines of the aircraft for use within the aircraft. Currently, airlines and maintenance personnel wait until a fault or problem occurs with the system and then attempt to identify the cause and fix it during either scheduled or, more likely, unscheduled maintenance. Fault occurrences are also recorded manually based on pilot discretion.

BRIEF DESCRIPTION

One embodiment relates to a method of diagnosing a fault in an air-conditioning pack of an aircraft, wherein the air-conditioning pack includes one or more sensors. The method includes transmitting data from at least one of the sensors operably coupled to the air-conditioning pack during one of pre-flight, post-flight, or longest cruise, comparing the transmitted data to a predetermined threshold, diagnosing a fault in the air-conditioning pack based on the comparison, and providing an indication of the diagnosed fault

DETAILED DESCRIPTION

Figure 1:
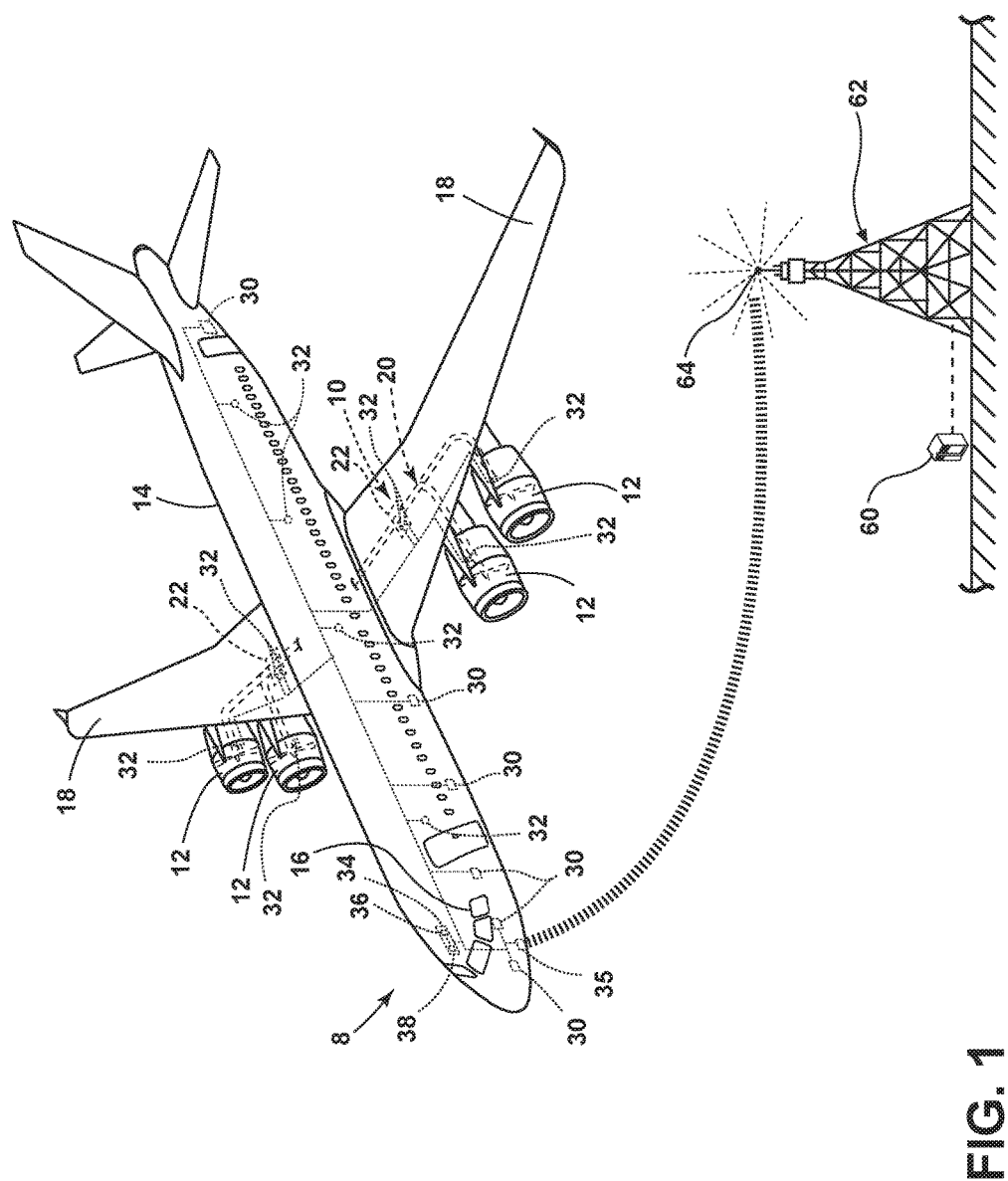
FIG. 1 is a perspective view of an exemplary aircraft and an exemplary ground system in which embodiments may be implemented.

FIG. 1 illustrates an aircraft 8 that may include an air-conditioning system 10, only a portion of which has been illustrated for clarity purposes, and may execute embodiments described herein. As illustrated, the aircraft 8 may include multiple engines 12 coupled to a fuselage 14, a cockpit 16 positioned in the fuselage 14, and wing assemblies 18 extending outward from the fuselage 14. While a commercial aircraft has been illustrated, embodiments may be used in any type of aircraft, for example, without limitation, fixed-wing, rotating-wing, rocket, personal aircraft, and military aircraft. Further, while two engines 12 have been illustrated on each wing assembly 18, it will be understood that any number of engines 12 including a single engine 12 may be included.

The air-conditioning system 10 may form a portion of the environmental control system of the aircraft 8 and may include a variety of subsystems. For example, among others, a bleed air system 20, one or more air-conditioning packs 22, and an air distribution or cabin temperature control system 24 (FIG. 3) may be included in the air-conditioning system 10. The bleed air system 20 may be connected to each of the engines 12 and air may be supplied to the air-conditioning system 10 by being bled from a compressor stage of each engine 12, upstream of the combustor. Various bleed ports may be connected to various portions of the engine 12 to provide highly compressed air to the bleed air system 20. The temperature and pressure of this bleed air varies widely depending upon which compressor stage and the RPM of the engine 12. The air-conditioning packs 22 and cabin temperature control system 24 will be described in more detail with respect to FIGS. 2 and 3 below.

A plurality of additional aircraft systems 30 that enable proper operation of the aircraft 8 may also be included in the aircraft 8. A number of sensors 32 related to the air-conditioning system 10, its subsystems, and the additional aircraft systems 30 may also be included in the aircraft 8. It will be understood that any number of sensors 32 may be included and that any suitable type of sensors 32 may be included. The sensors 32 may transmit various output signals and information.

A controller 34 and a communication system having a wireless communication link 35 may also be included in the aircraft 8. The controller 34 may be operably coupled to the air-conditioning system 10, the plurality of aircraft systems 30, as well as the sensors 32. The controller 34 may also be connected with other controllers of the aircraft 8. The controller 34 may include memory 36, the memory 36 may include random access memory (RAM), read-only memory (ROM), flash memory, or one or more different types of portable electronic memory, such as discs, DVDs, CD-ROMs, etc., or any suitable combination of these types of memory. The controller 34 may include one or more processors 38, which may be running any suitable programs. The controller 34 may be a portion of an FMS or may be operably coupled to the FMS.

A computer searchable database of information may be stored in the memory 36 and accessible by the processor 38. The processor 38 may run a set of executable instructions to display the database or access the database. Alternatively, the controller 34 may be operably coupled to a database of information. For example, such a database may be stored on an alternative computer or controller. It will be understood that the database may be any suitable database, including a single database having multiple sets of data, multiple discrete databases linked together, or even a simple table of data. In an embodiment, the database may incorporate a number of databases or that the database may actually be a number of separate databases. The database may store data that may include historical air-conditioning system data for the aircraft 8 and related to a fleet of aircraft. The database may also include reference values including threshold values, historic values, or aggregated values and data related to determining such reference values.

Alternatively, in an embodiment, the database may be separate from the controller 34 but may be in communication with the controller 34 such that it may be accessed by the controller 34. For example, in an embodiment, the database may be contained on a portable memory device and in such a case, the aircraft 8 may include a port for receiving the portable memory device and such a port would be in electronic communication with controller 34 such that controller 34 may be able to read the contents of the portable memory device. Additionally, the database may be updated through the wireless communication link 35 and that in this manner, real time information may be included in the database and may be accessed by the controller 34.

In another embodiment, such a database may be located off the aircraft 8 at a location such as an airline operation center, flight operations department control, or another location. The controller 34 may be operably coupled to a wireless network over which the database information may be provided to the controller 34.

While a commercial aircraft has been illustrated, it is possible that portions of the embodiments may be implemented anywhere including in a computer or controller 60 at a ground system 62. Furthermore, the database(s) as described above may also be located in a destination server or a controller 60, which may be located at and include the designated ground system 62. Alternatively, the database may be located at an alternative ground location. The ground system 62 may communicate with other devices including the controller 34 and databases located remote from the controller 60 via a wireless communication link 64. The ground system 62 may be any type of communicating ground system 62 such as an airline control or flight operations department.

Figure 2:
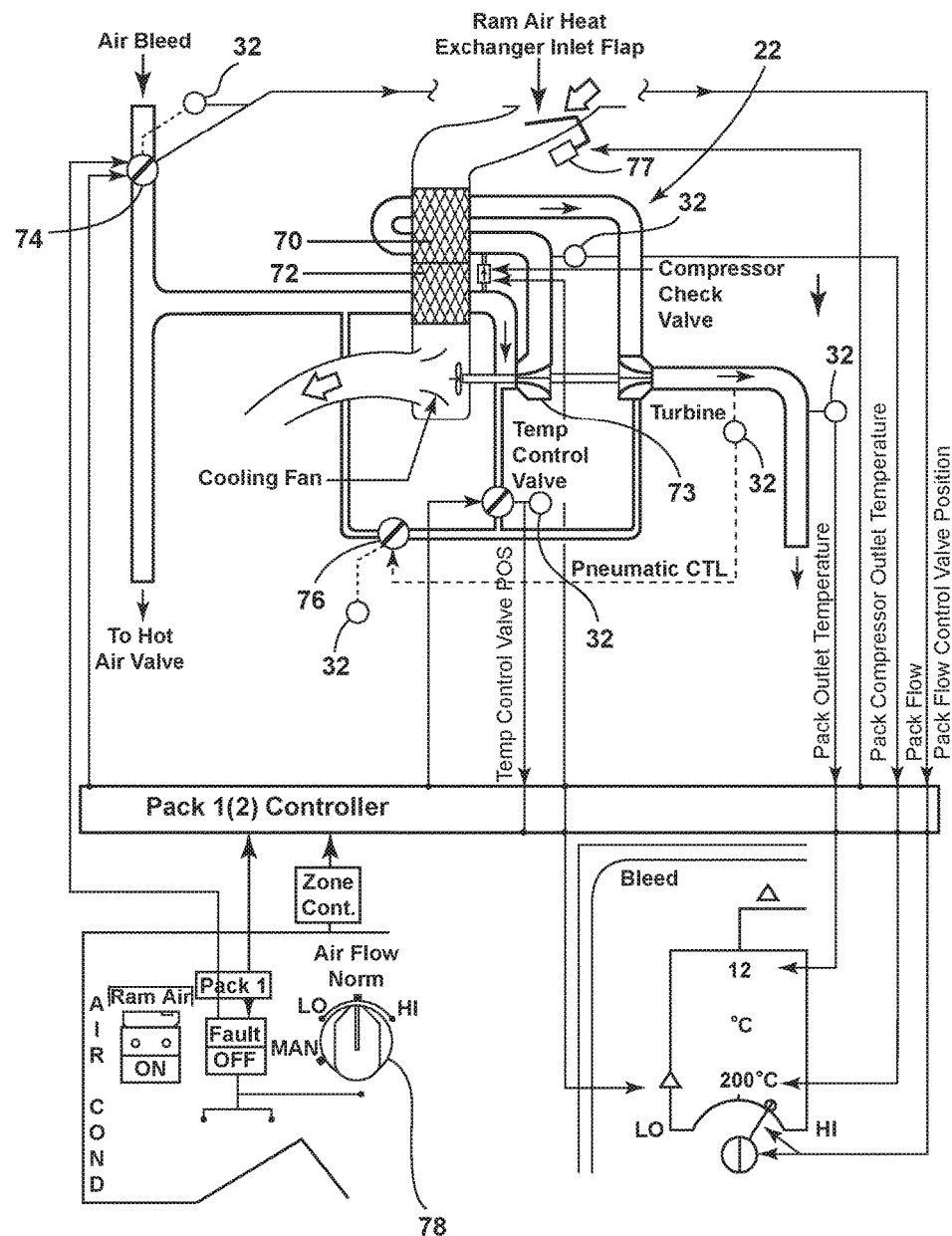
FIG. 2 is a schematic view of a portion of an exemplary air-conditioning system.

FIG. 2 illustrates an exemplary schematic view of a cold air unit also known as an air-conditioning pack 22 having a main heat exchanger 70, a primary heat exchanger 72, compressor 73, a flow control valve 74, a turbine 75, an anti-ice valve 76, a ram air inlet flap actuator 77, and a controller 78, which may be located within the cockpit 16 of the aircraft 8 and may be operably coupled to the controller 34. It will be understood that additional components may also be included and that the above is merely an example. Further, a number of sensors 32 have been illustrated as being included within the air-conditioning pack 22. The sensors 32 may output a variety of data including data related to temperatures of the air-conditioning pack 22, pressures of the air-conditioning pack 22, or valve positions. For example, some of the sensors 32 may output various parameters including binary flags for indicating valve settings and/or positions including for example the state of the valve (e.g. fully open, open, in transition, close, fully closed).

It will be understood that any suitable components may be included in the air-conditioning pack 22 such that it may act as a cooling device. The quantity of bleed air flowing to the air-conditioning pack 22 is regulated by the flow control valve 74. The bleed air enters the primary heat exchanger 72 where it is cooled by either ram air, expansion, or a combination of both. The cold air then enters the compressor 73, where it is re-pressurized, which reheats the air. A pass through the main heat exchanger 70 cools the air while maintaining the high pressure. The air then passes through the turbine 75, which expands the air to further reduce heat.

Figure 3:
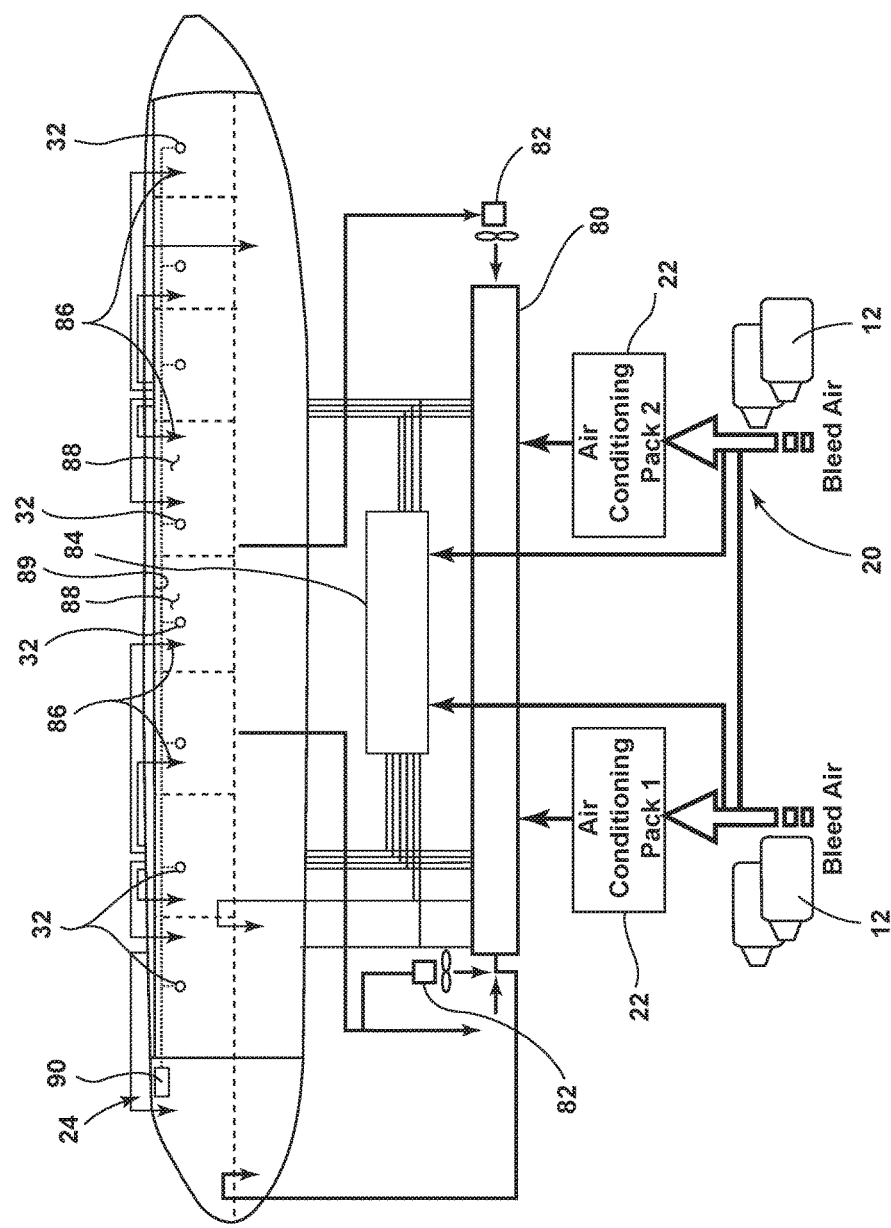
FIG. 3 is a schematic view of a portion of an exemplary air-conditioning system.

FIG. 3 illustrates an exemplary diagram of a cabin temperature control system 24 having a mixer unit 80, recirculation fans 82, a manifold 84, and nozzles 86 that distribute air into zones 88 within the cabin 89 of the aircraft 8, as well as a control mechanism 90. As illustrated, exhaust air from the air-conditioning packs 22 may be mixed in a mixer unit 80 with filtered air from the recirculation fans 82 and fed into a manifold 84. Air from the manifold 84 may be directed through ducts to overhead distribution nozzles 86 in the various zones 88 of the aircraft 8. A control mechanism 90 may control the temperature in each zone 88 as well as a variety of other aspects of the cabin temperature control system 24. It will be understood that the control mechanism may be operably coupled to the controller 34. A number of sensors 32 may be included and may output signals related to various aspects of the cabin temperature control system 24 including air temperatures within the zones 88, pressures within the cabin temperature control system 24, temperatures of physical portions of the cabin temperature control system 24 including duct temperatures, etc.

It will be understood that the controller 34 and the controller 60 merely represent two exemplary embodiments that may be configured to implement embodiments or portions of embodiments. During operation, either the controller 34 and/or the controller 60 may diagnose a fault with the air-conditioning system 10 or a subsystem thereof. By way of non-limiting example, one or more sensors 32 may transmit data relevant to various characteristics of the air-conditioning system 10. The controller 34 and/or the controller 60 may utilize inputs from the control mechanisms, sensors 32, aircraft systems 30, the database(s), and/or information from airline control or flight operations department to diagnose the fault with the air-conditioning system 10 or a subsystem thereof. Among other things, the controller 34 and/or the controller 60 may analyze the data over time to determine drifts, trends, steps, or spikes in the operation of the air-conditioning system 10. The controller 34 and/or the controller 60 may also analyze the sensor data and diagnose faults in the air-conditioning system 10 based thereon. Once a fault with the air-conditioning system 10 or a subsystem thereof has been diagnosed, an indication may be provided on the aircraft 8 and/or at the ground system 62. In an embodiment, the diagnosis of the fault with the air-conditioning system 10 or a subsystem thereof may be done during flight, may be done post flight, or may be done after any number of flights. The wireless communication link 35 and the wireless communication link 64 may both be utilized to transmit data such that the fault may be diagnosed by either the controller 34 and/or the controller 60.

One of the controller 34 and the controller 60 may include all or a portion of a computer program having an executable instruction set for diagnosing an air-conditioning system fault in the aircraft 8. Such diagnosed faults may include improper operation of components as well as failure of components. As used herein the term diagnosing refers to a determination after the fault has occurred and contrasts with prediction, which refers to a forward-looking determination that makes the fault known in advance of when the fault occurs. Along with diagnosing the controller 34 and/or the controller 60 may detect the fault. Regardless of whether the controller 34 and/or the controller 60 runs the program for diagnosing the fault, the program may include a computer program product that may include machine-readable media for carrying or having machine-executable instructions or data structures stored thereon.

It will be understood that details of environments that may implement embodiments are set forth in order to provide a thorough understanding of the technology described herein. It will be evident to one skilled in the art, however, that the exemplary embodiments may be practiced without these specific details. The exemplary embodiments are described with reference to the drawings. These drawings illustrate certain details of specific embodiments that implement a module or method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system. Further, multiple computers or processors may be utilized including that the controller 34 and/or the controller 60 may be formed from multiple controllers. It will be understood that the controller diagnosing the fault may be any suitable controller including that the controller may include multiple controllers that communicate with each other.

As noted above, embodiments described herein may include a computer program product including machine-readable media for carrying or having machine-executable instructions or data structures stored thereon. Such machine-readable media may be any available media, which may be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium that can be used to carry or store desired program codes in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data, which cause a general-purpose computer, special purpose computer, or special purpose processing machines to perform a certain function or group of functions.

Embodiments will be described in the general context of method steps that may be implemented in one embodiment by a program product including machine-executable instructions, such as program codes, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program codes for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configurations, including personal computers, hand-held devices, multiprocessor systems, microprocessor-based or programmable consumer electronics, network PCs, mini-computers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

Figure 4:
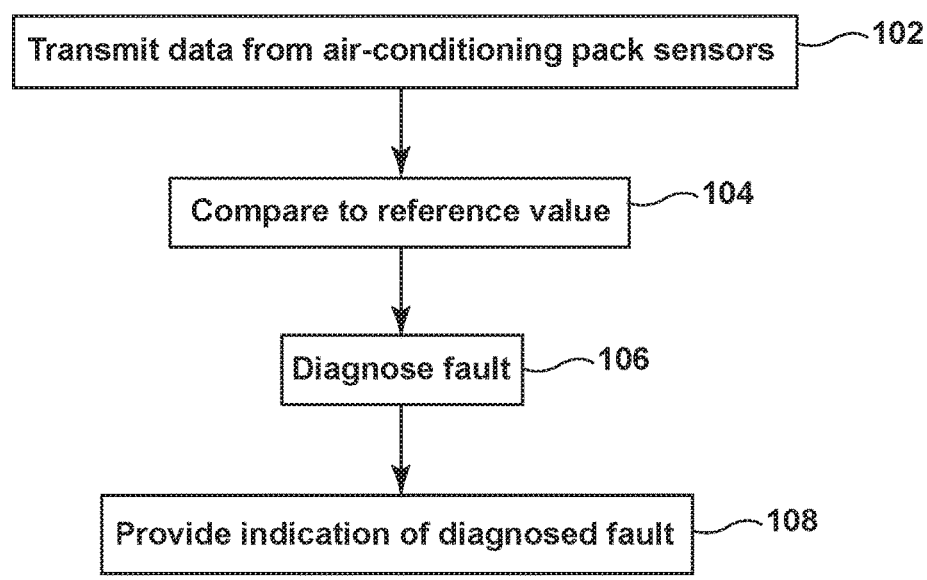
FIG. 4 is a flowchart showing a method of diagnosing a fault in an air-conditioning pack according to an embodiment.

In accordance with an embodiment, FIG. 4 illustrates a method 100, which may be used for diagnosing a fault in an air-conditioning pack 22 of the air-conditioning system 10; such a diagnosed fault may include a diagnosed failure or where the level of the fault increases to where the system fails. The method 100 begins at 102 by transmitting from one or more sensors 32 data related to the air-conditioning pack 22. More specifically, data may be transmitted from one or more sensors 32 outputting data related to temperatures, pressures or flow rates, valve positions, actuator positions, etc. for components of the air-conditioning packs 22 and their associated controllers 78. This may include sequentially and/or simultaneously transmitting data from one or more of the sensors 32. The transmitted data may be received by any suitable device including a database or the controller 34 and/or the controller 60.

The transmitted data may be related to the pre-flight, post-flight, or longest cruise segments of the flight. More specifically, the transmitted data may be sensor output(s) from the pre-flight post-flight, or longest cruise. In an embodiment, the transmitted data may be from any combination of the pre-flight, post-flight, and/or longest cruise including that data may be transmitted related to the pre-flight, the post-flight, and the longest cruise. The term pre-flight as used herein indicates any time until the wheels are lifted for flight, including taxiing of the aircraft 8, and may more specifically include the time from when one or more engines have started and the doors are closed until start of the takeoff roll. The term post-flight as used herein indicates a time after the aircraft lands, including taxiing of the aircraft 8, and may more specifically include the time after braking is complete and before the main engine is shut down or the parking brake is set. In an embodiment, additional standard parameters, recorded by onboard systems, may be transmitted, such as altitude and air or ground speed, such that the controller 34 and/or the controller 60 may determine when the aircraft 8 is in pre-flight, post-flight, and/or longest cruise. While the transmitted data may be related to pre-flight, post-flight, and/or longest cruise, it is possible that the data may be transmitted during any number of different phases of flight of the aircraft 8 or after the aircraft 8 has completed the flight. For example, sensor output may be transmitted once per flight, multiple times per flight, or after the flight.

The transmitting of data at 102 may define sensor output(s) relevant to one or more characteristics of the air-conditioning pack 22. In an embodiment, the sensor output(s) may include raw data from which a variety of other information may be derived or otherwise extracted to define the sensor output. It will be understood that regardless of whether the sensor output is received directly or derived from received output, the output may still be considered sensor output. For example, the sensor output may be aggregated over time to define aggregated sensor data. Aggregating the transmitted sensor output over time may include aggregating the transmitted sensor output over multiple phases of flight and/or over multiple flights. Such aggregated sensor data may include a median value, a maximum value, a minimum value, etc. Such aggregated sensor data may be reset after a maintenance event. It will be understood that the transmitted data, including any sensor output, may include time series data (eg. 1 Hz), aggregates, computed values, etc.

At 104, the transmitted data or sensor output may be compared to a predetermined threshold for the transmitted data. The predetermined threshold may be any suitable predetermined threshold related to the transmitted data including that the predetermined threshold may be a temperature value, a pressure value, an acceptable valve or actuator position range, etc. The predetermined threshold for the transmitted data may also include a historical predetermined threshold for the sensor output including for example historical data related to the air-conditioning system of the aircraft or historical data for multiple other aircraft. Thus, the output signal may be compared to results obtained from previous flights for the same aircraft and against the whole fleet of aircraft. Furthermore, the predetermined threshold for the sensor output may include a value that has been determined during operation. Alternatively, the predetermined thresholds may be stored in one of the database(s) as described above.

In this manner, the sensor output may be compared to a predetermined threshold for the sensor output. Any suitable comparison may be made. For example, the comparison may include determining a difference between the sensor output and the predetermined threshold. By way of non-limiting example, the comparison may include comparing a recent signal output to a historic value. Comparisons may be made on a per flight basis or the data may be processed over a series of flights. Comparisons may further measure a change in correlation between two parameters including where the correlation exceeds a given threshold. For example, in the instance where the transmitted data may be indicative of temperatures, pressures, valve and actuator positions of the air-conditioning pack 22 during the pre-flight and/or the cruise, the comparing may include comparing the temperatures, pressures, and positions to corresponding predetermined thresholds. In the case where median values are calculated for the transmitted data, the comparing at 104 may include comparing the median value to the predetermined threshold. Further still, when minimums and maximums for the transmitted data may be determined, the comparing at 104 may include comparing the minimums and/or maximums to the predetermined thresholds. In an embodiment, multiple comparisons may be made at 104. For example, one type of sensor data may be transmitted multiple times and the comparisons may compare the data to a predetermined threshold such as a control limit.

At 106, a fault in an air-conditioning pack 22 of the air-conditioning system 10 may be diagnosed based on the comparison at 104. For example, a fault in the air-conditioning pack 22 may be diagnosed when the comparison indicates that the sensor satisfies a predetermined threshold. The term "satisfies" the threshold is used herein to mean that the variation comparison satisfies the predetermined threshold, such as being equal to, less than, or greater than the threshold value. It will be understood that such a determination may easily be altered to be satisfied by a positive/negative comparison or a true/false comparison. For example, a less than threshold value can easily be satisfied by applying a greater than test when the data is numerically inverted.

Any number of faults in the air-conditioning system 10 may be diagnosed so long as the relevant data is obtained, appropriate comparisons are made, etc. By way of non-limiting example, a fault may be diagnosed with a ram air inlet flap actuator 77 of the air-conditioning pack 22. More specifically, when the comparison at 104 indicates a position of the ram air inlet flap of the air-conditioning pack 22 does not satisfy the predetermined threshold during cruise a fault with the ram air inlet flap actuator 77 may be diagnosed. The comparison may indicate that the ram air inlet flap position remains more open than normal during cruise. This may be observable in the comparison as an extreme median value during cruise, such as a value greater than a predetermined threshold of 40 degrees. Alternatively, diagnosing the fault may be based on multiple comparisons. More specifically, the ram air inlet flap position may be determined to be at an above normal position but because of the additional cooling provided, a comparison may indicate that the compressor outlet temperature is lower than normal and/or that the pack outlet temperature is erratic. Erratic behavior may be identified through standard deviation features. In addition, a bypass valve position may be determined to be higher as it opens to try to maintain a pack outlet temperature. These additional comparisons provide diagnostics that the ram air inlet flap actuator 77 is at fault and that it is not just attempting to compensate for another fault. Sensor faults may also be determined by determining a high number of out of range readings or for example via comparisons of recent median temperatures to historic median temperature where other readings were determined to be normal. It will be understood that any number of faults may be diagnosed based on any number of comparisons. These comparisons may also be used to provide information relating to the severity of the fault.

It will be understood that the transmitted data may be related to multiple sensor readings of the air-conditioning pack 22 and that diagnosing the fault may be based on one comparison or multiple comparisons. The comparison or combination of comparisons may indicate which sensors, parts or sub-systems are likely to be at fault. For example, a fault of a primary heat exchanger 72 of the air-conditioning pack 22 may be diagnosed when the comparisons indicate a water extractor temperature above the predetermined threshold and a compressor outlet temperature above the predetermined threshold. Further, a fault with a condenser of the air-conditioning pack 22 may be diagnosed when the comparisons indicate a compressor outlet temperature above the predetermined threshold and a water extractor temperature that satisfies the predetermined threshold during cruise period of flight.

In implementation, the predetermined threshold values for the sensor data and comparisons may be converted to an algorithm to diagnose faults in the air-conditioning pack 22. Such an algorithm may be converted to a computer program including a set of executable instructions, which may be executed by the controller 34 and/or the controller 60. Alternatively, the computer program may include a model, which may be used to diagnose faults in the air-conditioning system 10. A model may include the use of reasoning networks, flow charts, or decision trees. Diagnosis may be based upon understanding of the system and patterns in the data compared to previous faults. The model may ensure all information available is used and may discount false positives. For example, the model may use knowledge that singular spikes in pressure may be associated with maintenance on the air-conditioning system.

At 108, the controller 34 and/or the controller 60 may provide an indication of the fault in the air-conditioning pack 22 of the air-conditioning system 10 diagnosed at 106. The indication may be provided in any suitable manner at any suitable location including in the cockpit 16 and at the ground system 62. For example, the indication may be provided on a primary flight display (PFD) in a cockpit 16 of the aircraft 8. If the controller 34 ran the program, then the indication may be provided on the aircraft 8 and/or may be uploaded to the ground system 62. Alternatively, if the controller 60 ran the program, then the indication may be uploaded or otherwise relayed to the aircraft 8. Alternatively, the indication may be relayed such that it may be provided at another location such as an airline control or flight operations department.

It will be understood that the method of diagnosing a fault in an air-conditioning pack 22 is flexible and the method illustrated is merely for illustrative purposes. For example, the sequence of steps depicted is for illustrative purposes only, and is not meant to limit the method 100 in any way, as it is understood that the steps may proceed in a different logical order or additional or intervening steps may be included. For example, the predetermined threshold may be determined by the controller 34 and/or the controller 60 from flow rate data transmitted from another air-conditioning pack 22 of the aircraft 8. By way of non-limiting example, in such an instance, diagnosing the fault may include diagnosing the fault with a controller 78 of the air-conditioning pack 22 when the comparisons indicate a divergence in flow between the two air-conditioning packs 22 of the aircraft 8.

By way of further example, different comparisons may indicate a particular fault depending on the particular phase the sensor transmitted the data. In the case where an algorithm, computer program, model, etc. is used to diagnose the fault, the fault differs for data transmitted in cruise and data transmitted on the ground, either pre-flight or post-flight. Alternatively, the same comparison may be utilized to indicate a particular fault. For example, data at a certain phase of aircraft operation may indicate a particular diagnosis as shown in Table 1 below.

TABLE 1

| Exemplary Determined Diagnosis | | |
|---|---|---|
| Faulty component | Indicating factors in cruise | Indicating factors on ground |
| Primary heat exchanger | Water extractor temperature high, compressor outlet temperature high, RAM air flap open with bypass normal | Water extractor temperature high, compressor outlet temperature high, RAM air flap open and bypass closed, reduced pack flow |
| Main heat exchanger | Water extractor temperature high, compressor outlet temperature low, RAM air flap open with bypass normal | Water extractor temperature high, compressor outlet temperature high, RAM air flap open and bypass closed, reduced pack flow |
| Re-heater/ condenser | Compressor outlet temperature high and water extractor temperature normal | Compressor outlet temperature high and water extractor temperature high |
| RAM air actuator | RAM air flap more open, bypass valve opening, pack outlet temperature low or erratic | Should be fully open on ground |
| Flow control valve | Divergence in flow between packs, other parameters appear normal | Divergence in flow between packs, other parameters appear normal |
| Bypass valve | Erratic behaviour | Opening on ground |
| pressure sensors | Flow control valve erratic opening/closing | Flow control valve erratic opening/closing |
| Duct damage | Sudden step change in pack outlet temperature | Sudden step change in pack outlet temperature |
| Anti-ice valve | Pack outlet temperature step change to 15° C. consistently | Pack outlet temperature step change to 15° C. consistently |
| Pack controllers | Divergence in flow between packs, pressure sensors ok and potentially erratic pack outlet temperatures | Divergence in flow between packs, pressure sensors ok and potentially erratic pack outlet temperatures |

By way of further example, in an embodiment, the transmitted data may include data from a plurality of flights, including the pre-flight, post-flight, and/or longest cruise portions of such plurality of flights. In such an instance, comparing the transmitted data may include comparing the data from the plurality of flights with related predetermined threshold(s). In this manner, multiple comparisons may be made utilizing the data for the plurality of flights. Further, diagnosing the fault may include diagnosing the fault when the comparisons indicate the predetermined thresholds are satisfied a predetermined number of times and/or over a predetermined number of flights including over multiple flights. Further, the diagnosed fault may be based on derived data such as medians, minima, maximum values, standard deviations, counts above or below thresholds, change of state, correlations, etc. that may be calculated per phases of the flight of the aircraft.

For example, Table 2 below details some numerical thresholds used during the diagnosing for a first type of aircraft such as an A320 including the number of times over a specific number of flights that the criteria occurs.

TABLE 2

| Exemplary Criteria | | | | | | |
|---|---|---|---|---|---|---|
| | Number of times | Number of flights | Cruise Median | | Pre-flight median | |
| | | | Low | High | Low | High |
| BypassVlv1 | 2 | 3 | 12 percent open | | | |
| BypassVlv2 | 2 | 3 | 12 percent open | | | |
| DeltaEngPreComprOut1 | 3 | 3 | | | | 0° C. |
| DeltaEngPreComprOut2 | 3 | 3 | | | | 0° C. |
| DeltaPackOut2Duct2 | 8 | 15 | | | 5° C. | |
| DeltaPackOut2Duct3 | 8 | 15 | | | 5° C. | |
| DeltaWaterExtPackOut1 | 4 | 5 | | | −70° C. | |
| DeltaWaterExtPackOut2 | 4 | 5 | | | −70° C. | |
| PackComprOutTemp1 | 3 | 3 | 110° C. | 190° C. | | 175° C. |
| PackComprOutTemp2 | 3 | 3 | 110° C. | 190° C. | | 175° C. |
| PackComprOutTempDiv | 3 | 3 | | | −25° C. | 25° C. |
| PackFlow1 | 3 | 3 | 0.1 kg/s | | | |

TABLE 2-continued

Exemplary Criteria

| | Number of times | Number of flights | Cruise Median | | Pre-flight median | |
|---|---|---|---|---|---|---|
| | | | Low | High | Low | High |
| PackFlow2 | 3 | 3 | 0.1 kg/s | | | |
| PackOutTemp1 | 3 | 3 | | | | 20° C. |
| PackOutTemp2 | 3 | 3 | | | | 20° C. |
| PackRamInPos1 | 3 | 3 | | 30 percent open | | |
| PackRamInPos2 | 3 | 3 | | 30 percent open | | |
| PackRamInPosDiv | 8 | 15 | −10 percent open | 10 percent open | | |
| PackWaterExtTemp1 | 3 | 3 | | | | 85° C. |
| PackWaterExtTemp2 | 3 | 3 | | | | 85° C. |

By way of further example, Table 3 below details alternative numerical threshold used during diagnosing for a second type of aircraft such as an A330 including the number of times over a specific number of flights that the criteria occurs.

TABLE 3

Exemplary Criteria

| | Number of times | Number of flights | Cruise median | | Pre-flight median | |
|---|---|---|---|---|---|---|
| | | | Low | High | Low | High |
| DeltaWaterExtPackOut1 | 2 | 3 | | | −38° C. | |
| DeltaWaterExtPackOut2 | 2 | 3 | | | −38° C. | |
| PackComprOutTemp1 | 2 | 3 | | 167.5° C. | | 191° C. |
| PackComprOutTemp2 | 2 | 3 | | 167.5° C. | | 191° C. |
| PackComprOutTempDiv | 2 | 3 | | | −30.3° C. | 38.6° C. |
| PackFlow1 | 2 | 3 | 0.703 kg/s | | | |
| PackFlow2 | 2 | 3 | 0.703 kg/s | | | |
| PackOutTemp1 | 2 | 3 | | | | 11° C. |
| PackOutTemp2 | 2 | 3 | | | | 11° C. |
| PackRamInPos1 | 2 | 3 | | 43 percent open | | |
| PackRamInPos2 | 2 | 3 | | 43 percent open | | |
| PackRamInPosDiv | 2 | 3 | −26.25% | 11.25% | | |
| PackTempContrVlvPos1 | 2 | 3 | 26 percent open | | | |
| PackTempContrVlvPos2 | 2 | 3 | 26 percent open | | | |
| PackWaterExtTemp1 | 2 | 3 | | | | 38.1° C. |
| PackWaterExtTemp2 | 2 | 3 | | | | 38.1° C. |

Beneficial effects of the above-described embodiments include that data gathered by the aircraft may be utilized to diagnose a fault in an air-conditioning pack. This reduces maintenance times and the operational impact of faults and issues due to the air-conditioning pack. Particularly there may be a reduction in the time required to diagnose an issue and issues may be diagnosed accurately. This allows for cost savings by reducing maintenance cost, rescheduling cost, and minimizing operational impacts including minimizing the time aircraft are grounded.

This written description uses examples to disclose the embodiments, including the best mode, and also to enable any person skilled in the art to practice the embodiments, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of diagnosing a fault in an air-conditioning pack of an aircraft where the air-conditioning pack includes one or more sensors outputting data related to air-conditioning pack temperature, air-conditioning pack pressure, or air-conditioning pack valve position, the method comprising:

transmitting data from at least one of the sensors operably coupled to the air-conditioning pack during one of a pre-flight, a post-flight, or a longest cruise;
comparing the transmitted data to a predetermined threshold at least twice, defining multiple comparisons;
diagnosing, by a controller, a fault of a primary heat exchanger of the air-conditioning pack based on the multiple comparisons of the transmitted data to the predetermined thresholds when the multiple comparisons indicate a water extractor temperature above the predetermined threshold and a compressor outlet temperature above the predetermined threshold;
providing an indication of the diagnosed fault; and
performing maintenance of the air-conditioning pack in accordance with the indication of the diagnosed fault.

2. The method of claim 1, wherein transmitting the data comprises transmitting data during the pre-flight, the post-flight, and the longest cruise.

3. The method of claim 2, wherein transmitting the data comprises transmitting data from a plurality of flights.

4. The method of claim 1, wherein transmitting the data comprises transmitting data from a plurality of flights.

5. The method of claim 4, wherein diagnosing the fault comprises diagnosing the fault when the comparisons indicate thresholds are satisfied over multiple flights.

6. The method of claim 1, wherein the controller utilizes an algorithm to diagnose the fault.

7. The method of claim 6, wherein the algorithm utilized to diagnose the fault differs for data transmitted in cruise and data transmitted on the ground.

8. The method of claim 1, wherein the transmitted data is related to multiple sensor readings of the air-conditioning pack.

9. The method of claim 1, wherein diagnosing the fault comprises diagnosing the fault of a trim air valve of the air-conditioning pack when the comparisons indicate cabin temperatures do not satisfy the predetermined threshold.

10. The method of claim 1, wherein the predetermined threshold is determined from flow rate data transmitted from another air-conditioning pack of the aircraft.

11. The method of claim 10, wherein diagnosing the fault comprises diagnosing the fault with a controller of the air-conditioning pack when the comparisons indicate a divergence in flow between the two air-conditioning packs of the aircraft.

12. The method of claim 1, wherein diagnosing the fault comprises diagnosing a fault of a condenser of the air-conditioning pack when the comparisons indicate a compressor outlet temperature above the predetermined threshold and a water extractor temperature that satisfies the predetermined threshold.

13. The method of claim 1, wherein diagnosing the fault comprises diagnosing the fault of a RAM air actuator of the air-conditioning pack when the comparisons indicate RAM air inlet flaps are greater than the predetermined threshold and a pack outlet temperature is low or erratic.

14. The method of claim 1, wherein diagnosing the fault comprises diagnosing the fault of a trim air valve of the air-conditioning pack when the comparisons indicate cabin temperatures do not satisfy the predetermined threshold.

15. A method of diagnosing a fault in an air-conditioning pack of an aircraft where the air-conditioning pack includes one or more sensors outputting data related to air-conditioning pack temperature, air-conditioning pack pressure, or air-conditioning pack valve position, the method comprising:

transmitting data from at least one of the sensors operably coupled to the air-conditioning pack during one of a pre-flight, a post-flight, or a longest cruise;
comparing the transmitted data to a predetermined threshold at least twice, defining multiple comparisons;
diagnosing, by a controller, a fault of a condenser of the air-conditioning pack based on the multiple comparisons of the transmitted data to the predetermined thresholds when the comparisons indicate a compressor outlet temperature above the predetermined threshold and a water extractor temperature that satisfies the predetermined threshold;
providing an indication of the diagnosed fault; and
performing maintenance of the air-conditioning pack in accordance with the indication of the diagnosed fault.

16. The method of claim 15, wherein diagnosing the fault comprises diagnosing the fault of a trim air valve of the air-conditioning pack when the comparisons indicate cabin temperatures do not satisfy the predetermined threshold.

17. The method of claim 15, wherein transmitting the data comprises transmitting data during the pre-flight, the post-flight, and the longest cruise.

18. The method of claim 15, wherein transmitting the data comprises transmitting data from a plurality of flights and wherein diagnosing the fault comprises diagnosing the fault when the comparisons indicate thresholds are satisfied over multiple flights.

19. The method of claim 15, wherein the controller utilizes an algorithm to diagnose the fault and wherein the algorithm utilized to diagnose the fault differs for data transmitted in cruise and data transmitted on the ground.

20. The method of claim 15, wherein the predetermined threshold is determined from flow rate data transmitted from another air-conditioning pack of the aircraft.

21. The method of claim 20, wherein diagnosing the fault comprises diagnosing the fault with a controller of the air-conditioning pack when the comparisons indicate a divergence in flow between the two air-conditioning packs of the aircraft.

22. A method of diagnosing a fault in an air-conditioning pack of an aircraft where the air-conditioning pack includes one or more sensors outputting data related to air-conditioning pack temperature, air-conditioning pack pressure, or air-conditioning pack valve position, the method comprising:

transmitting data from at least one of the sensors operably coupled to the air-conditioning pack during one of a pre-flight, a post-flight, or a longest cruise;
comparing the transmitted data to a predetermined threshold at least twice, defining multiple comparisons;
diagnosing, by a controller, a fault of a RAM air actuator of the air-conditioning pack based on the multiple comparisons of the transmitted data to the predetermined thresholds when the comparisons indicate RAM air inlet flaps are greater than the predetermined threshold and a pack outlet temperature is low or erratic;
providing an indication of the diagnosed fault; and
performing maintenance of the air-conditioning pack in accordance with the indication of the diagnosed fault.

23. The method of claim 22, wherein transmitting the data comprises transmitting data during the pre-flight, the post-flight, and the longest cruise.

24. The method of claim 22, wherein transmitting the data comprises transmitting data from a plurality of flights and wherein diagnosing the fault comprises diagnosing the fault when the comparisons indicate thresholds are satisfied over multiple flights.

25. The method of claim 22, wherein the controller utilizes an algorithm to diagnose the fault and wherein the algorithm utilized to diagnose the fault differs for data transmitted in cruise and data transmitted on the ground.

26. The method of claim 22, wherein diagnosing the fault comprises diagnosing the fault with a ram air inlet flap actuator when the comparison indicates a position of the inlet flap does not satisfy the predetermined threshold during cruise.

27. The method of claim 22, wherein the transmitted data is related to multiple sensor readings of the air-conditioning pack.

28. The method of claim 22, wherein diagnosing the fault comprises diagnosing the fault of a trim air valve of the air-conditioning pack when the comparisons indicate cabin temperatures do not satisfy the predetermined threshold.

29. The method of claim 22, wherein the predetermined threshold is determined from flow rate data transmitted from another air-conditioning pack of the aircraft.

30. The method of claim 29, wherein diagnosing the fault comprises diagnosing the fault with a controller of the air-conditioning pack when the comparisons indicate a divergence in flow between the two air-conditioning packs of the aircraft.

* * * * *